United States Patent

[11] 3,549,051

| | | |
|---|---|---|
| [72] | Inventor | Robert S. Bencic<br>Chicago, Ill. |
| [21] | Appl. No. | 762,945 |
| [22] | Filed | Sept. 26, 1968 |
| [45] | Patented | Dec. 22, 1970 |
| [73] | Assignee | Eaton Yale & Towne, Inc.<br>Morton Grove, Ill.<br>a corporation of Ohio |

[54] HOT LIQUID DISPENSER
10 Claims, 3 Drawing Figs.

[52] U.S. Cl. ................................. 222/129.2, 222/146
[51] Int. Cl. .................................. B67d 5/56
[50] Field of Search .......................... 222/129.2, 193, 146(HE)

[56] References Cited
UNITED STATES PATENTS

| 2,869,760 | 1/1959 | Karlen | 222/146X(HE) |
| 3,007,609 | 11/1961 | Pascucci | 222/129.2 |
| 3,105,616 | 10/1963 | Krup | 222/129.2 |
| 3,270,918 | 9/1966 | Goodrich et al. | 222/146(HE) |

*Primary Examiner* — Stanley H. Tollberg
*Attorney* — Hill, Sherman, Meroni, Gross and Simpson

ABSTRACT: A liquid dispenser particularly suitable for dispensing beverages of the type wherein a liquid concentrate is mixed in suitable proportion with water employs separate reservoirs for the water and the concentrate and utilizes water under pressure and a venturi assembly for combining the water and the concentrate in the correct proportions as an aerated mixture. The water reservoir is provided with heating apparatus so that the dispenser is advantageously suitable for dispensing hot beverages.

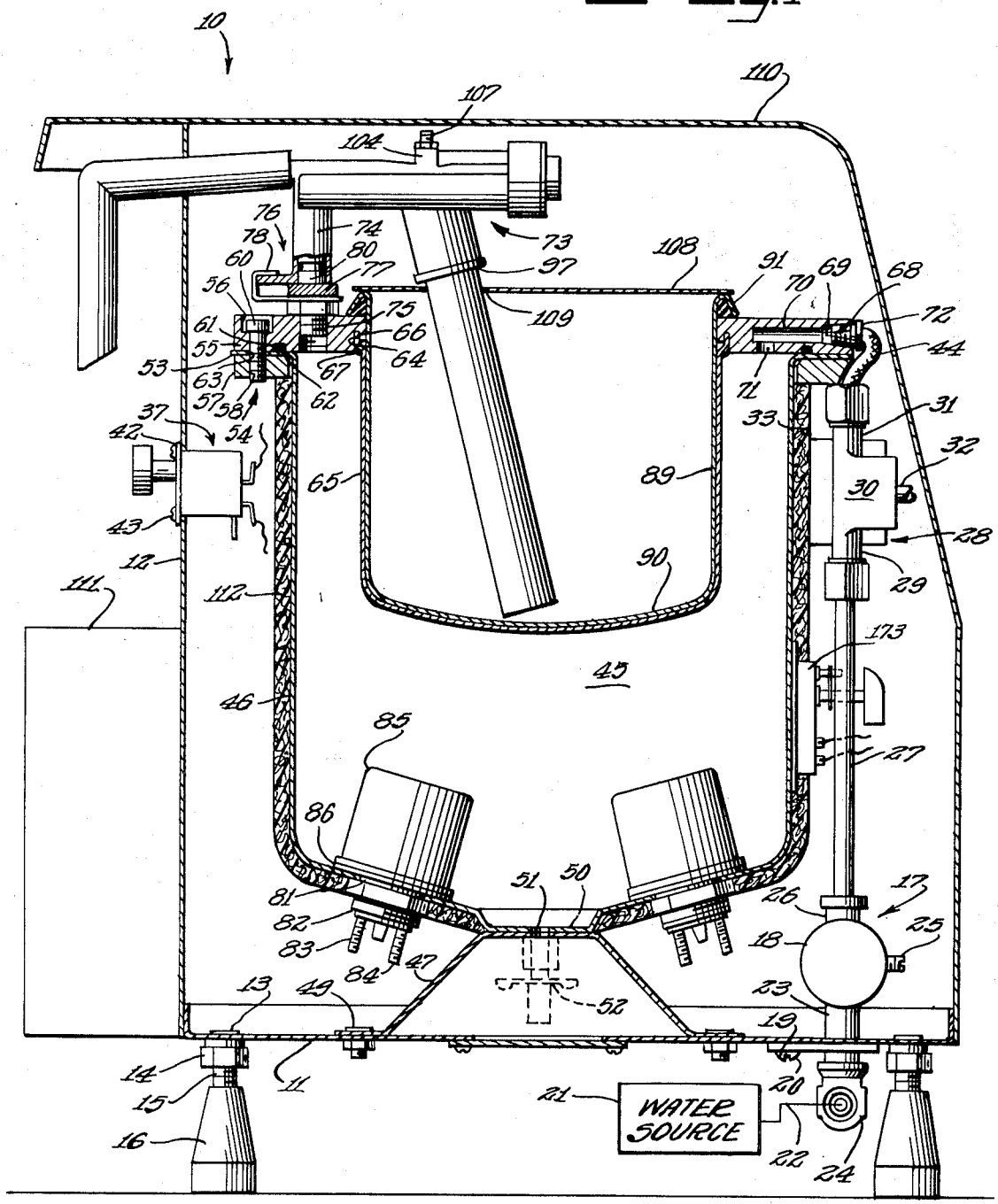

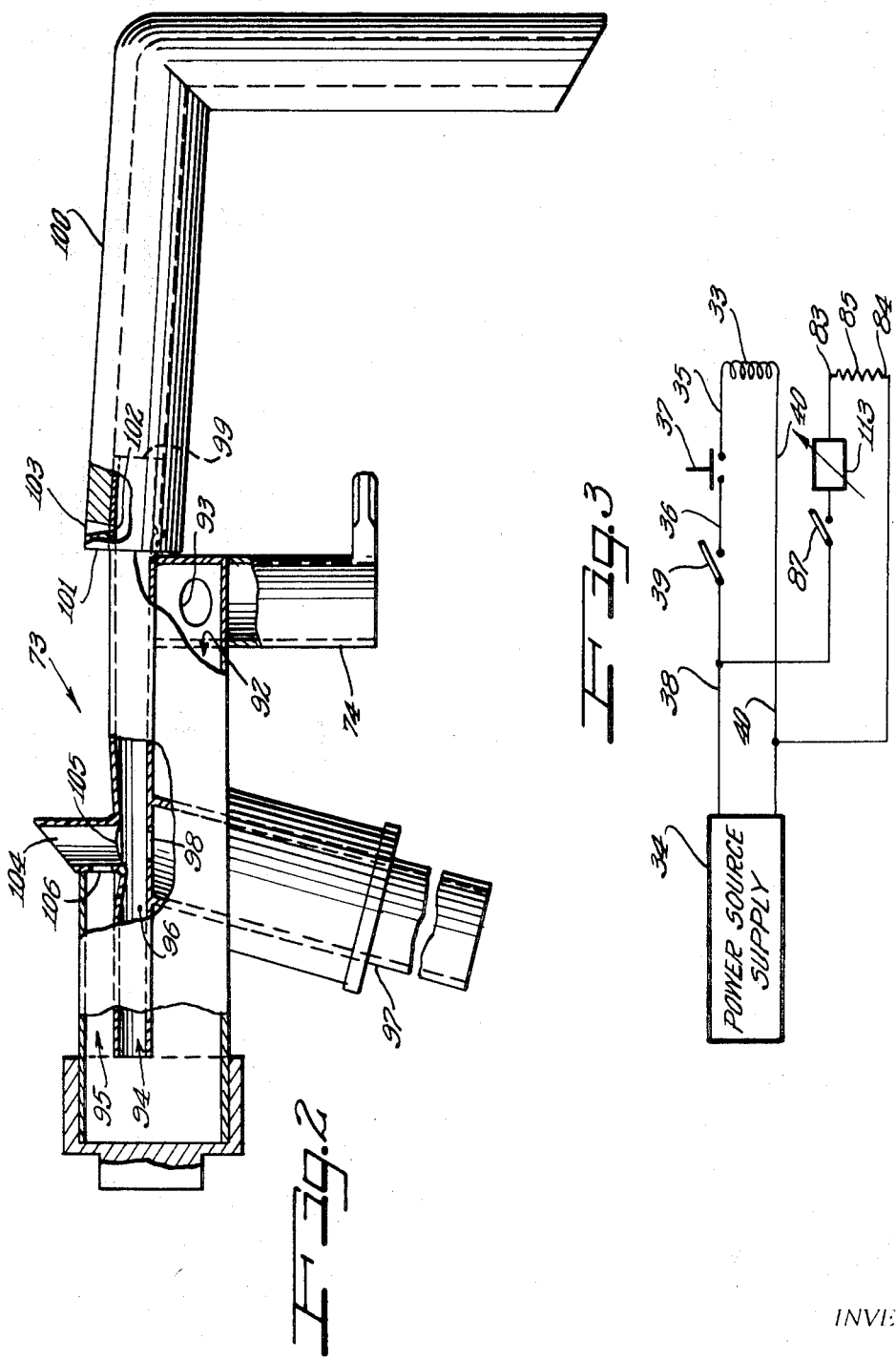

3,549,051

HOT LIQUID DISPENSER

BACKGROUND OF THE INVENTION

1. Field of the Invention

This invention relates to apparatus for dispensing liquids and more particularly to apparatus for dispensing hot beverages.

2. Description of the Prior Art

Heretofore apparatus for dispensing hot liquids have employed a variety of relays, solenoids and timers to mix together and dispense the constituent components of a hot beverage. Such an array of working components is expensive from the standpoints of design, component costs, system reliability and maintainability. An additional problem which emerged with the advent of liquid beverage concentrates, such as hot chocolate concentrates and the newer coffee and tea liquid concentrates, resides in the necessity to maintain the liquid concentrate at a temperature which prohibits bacterial growth in the concentrate.

The present invention overcomes all of the above disadvantages of the prior art by providing a hot liquid dispenser of the liquid concentrate type in which there is but a single moving part and in which all other system components have been held to a minimum.

SUMMARY OF THE INVENTION

According to the present invention, a reservoir for liquid concentrate is disposed within a reservoir which has therein heating apparatus for maintaining the dilution of mixing liquid (i.e. water), and thus the concentrate, above 140° F. to prohibit bacterial growth. Water is supplied to the water reservoir through a water pressure regulator and a three-way solenoid valve upon the operation of a dispenser switch by an operator. In its operated condition the solenoid valve functions to pressurize the water reservoir for dispensing and in its restored condition functions to vent the water reservoir to the atmosphere ensuring an unpressurized hot water tank for safety reasons and to prevent beverage drip from the dispenser nozzle. Upon operation of the dispenser switch and pressurization of the hot water tank, hot water is supplied from the water tank to a water inlet of a venturi assembly which is also in fluid communication with the liquid concentrate. In the venturi assembly, a first venturi means functions to mix the liquid concentrate with the water flowing through the venturi assembly and a second venturi means in fluid communication with the atmosphere which functions to aerate the hot beverage and provide it with the proper bouquet.

BRIEF DESCRIPTION OF THE DRAWINGS

The invention, its organization and construction, will be best understood by reference to the following description taken in conjunction with the accompanying drawings, in which:

FIG. 1 is an elevational view, partly in cross section, illustrating an embodiment of the invention;

FIG. 2 is a top view, partly in section, of the venturi assembly of FIG. 1; and

FIG. 3 is a schematic diagram of the electrical circuit of the apparatus of FIG. 1.

DESCRIPTION OF THE PREFERRED EMBODIMENT

In FIGS. 1, 2, and 3 there is shown a dispenser, generally at 10, having a bottom plate 11 and a lower housing 12 for mounting components thereon and enclosing the dispenser. The bottom plate 11 is provided with apertures 13 and nuts 14 for receiving the threaded lugs 15 having rubber feet 16 for providing nonskid contact with a supporting table or counter.

A water pressure regulator 17 including a body 18 having a mounting flange 19 secured to the bottom plate 11 by machine screws 20 is provided with water from the water supply 21 through a fluid conduit or tubing 22 to its inlet port 23 via the female elbow 24. The pressure regulator ensures a predetermined water pressure, for example, 30 p.s.i. to provide consistent operation of the venturi assembly 73. The pressure of the regulator 17 may be adjusted by means of the screw valve 25. The pressure regulator also has a discharge port 26 connected to a tubing 27 for supplying water to the three-way solenoid valve 28 by way of its inlet port 29.

Solenoid valve 28 comprises a valve body 30 including a discharge port 31 for supplying water to the water tank and a vent port 32 for venting the water tank 46. In addition, the solenoid valve 28 includes a solenoid 33 which in its unoperated condition completes a fluid passage between the discharge port 31 and the vent port 32 to vent the hot water reservoir, and in its operated condition solenoid valve 28 establishes a fluid passage between its inlet port 29 and the discharge port 31 to pressurize the water tank 46 reservoir for dispensing. The solenoid 33 is connected to a source of commercial power supply 34, such as 120 volts at 60 cps, over conductor 35 and conductor 36 in series with the DISPENSE switch 37, conductor 38, DISPENSE POWER switch 39, and conductor 40. The DISPENSE POWER switch is mounted on bottom plate 11 by means of a bolt and nut assembly 41 and functions as an on/off switch for placing the dispenser in and out of service. The DISPENSE switch 37 includes a mounting flange 42 which is secured to the lower housing 12 by means of machine screws 43. Switch 37 is preferably of the type which is spring loaded toward its nonconducting condition and functions to initiate liquid dispensing only during the closing thereof by an operator. Closing of switch 37 (with switch 39 closed) energizes the solenoid 33 to place the inlet port 29 and the discharge port 31 in fluid communication. Opening of switch 37 permits deenergization of solenoid 33 and places the discharge port 31 and the vent port 32 in fluid communication.

Tubing 44 is connected between the discharge port 31 and the reservoir assembly, generally shown at 45. The reservoir assembly comprises a water tank 46 carried by the bottom plate 11 by means of a mounting bracket 47 having machine screws 49 securing the mounting bracket to the bottom plate 11. Water tank 46 is generally cylindrical in shape and includes a bottom 50 having an aperture 51 therein for receiving a lug-type valve assembly 52 for flushing and cleaning the water tank. The water tank has an open top defined by the flared edge portion 53 thereof.

A flange assembly 54 assists in sealing the water tank and annular shape upper flange 55 having a plurality of counter sunk apertures 56 aligned with a plurality of apertures 63 in the flared edge portion 53 of water tank 46 and a lower flange 57 having a plurality of threaded apertures 58 aligned with apertures 56, 63 of the upper flange and flared edge portions, respectively, with machine screws 60 extending through the aligned apertures to secure the water tank 46 between the upper flange 55 and the lower flange 57. An annular groove 61 in the lower flange 57 is provided with an O-ring seal 62 which is compressible upon the tightening of the machine screws 60 to provide a watertight seal between the water tank 46 and the flange assembly 54. Also assisting in sealing the water tank 46 is reservoir sealing shell 65 having a shell edge 66 disposed in a second annular groove 64 of the lower flange 57. A sealant 67 is provided at the junction of the outer surface of shell 65 and the groove 64.

The water tank 46 is provided with fluid communication from the discharge port 31 of the solenoid valve 28 by tube 44 and the upper flange 55. A water passageway 68 extends from the outer peripheral surface of the upper flange 55 to the lower planar surface of upper flange 55 and comprises a tapped counted sunk portion 69, a horizontal smaller portion 70 and a vertical portion 71. A connector 72 couples tubing 44 to the tapped countersunk portion 69 of the water passageway 68. Upon energization of solenoid 33 by the operation of DISPENSE switch 37, a complete fluid passageway exists between the water supply 21 and the water tank 46 at the pressure which is regulated by the pressure regulator 17.

A venturi assembly, generally shown at 73, is coupled to the water tank 46 to complete the water circuit. The venturi assembly comprises an inlet port 74 which is coupled to the water tank 46 through an aperture 75 in the upper flange 55 and a locking mechanism 76 which includes a knurled nut 77 and a clamp 78 for clamping the protruding foot 79 of inlet port 74. Locking mechanism 76 includes a tubular member 80 through which the water tank 46 is in fluid communication with the inlet port 74 of venturi assembly 73.

The water tank 46 includes apertures 81 for receiving the lug and nut assemblies 82 and the electrical connection lugs 83, 84 of heaters 85. A gasket 86 is provided to provide a watertight seal between the heaters 85 and the water tank 46. The heaters are connected to the voltage supply 34 by way of connection lug 84 and conductor 40, and connection lug 83 in series with a HEATER POWER switch 87 and thermostat 113. The function of the HEATER POWER switch 87 is to place the heaters 85 in and out of service. From the discussion thus far, it is understood that hot water may be supplied to the inlet port 74 of the venturi assembly 73 with the heaters 85 connected in circuit; however, a refrigeration unit may replace the heaters for dispensing cold beverages. The water tank 46 is insulated by material 112 wrapped thereabout.

A reservoir is provided for a liquid beverage concentrate by concentrate tank 89 having a closed bottom 90 and an open top defined by the flared back edge 91. The concentrate tank 89 is removably disposed in shell 65 and depends from its edge 91 bearing on the upper planar surface of the upper flange 55. A liquid concentrate placed in the concentrate tank 89 will be heated by the hot water in water tank 46 by heat conduction through shell 65 and the concentrate tank 89 to a temperature above a predetermined temperature at which the growth of bacteria is prohibited, say 140° F., as set by adjustable thermostat 113.

The venturi assembly 73 includes a plurality of fluid passageways for carrying and mixing the constituents of the beverage. A first of these passageways is the inlet passageway 92 which is in fluid communication with the inlet port 74 by way of orifice 93.

Passageway 92 extends from the inlet port 74 and orifice 93 to the rear of the venturi assembly 73 where the flow of water divides between two passageways 94, 95 which are generally defined by their respective circular walls. Passageway 94 extends and transports the hot water from the rear of the venturi assembly 73 forward to a constricted mixing chamber 96 at which the velocity of the water is increased due to the constriction of chamber 96. The concentrate tank 89 is in fluid communication with the mixing chamber 96 by way of a concentrate inlet port 97 which extends from the venturi assembly 73 into the concentrate tank 89 and orifice 98 disposed in the wall of passageway 94 which separates passageway 94 and the concentrate inlet port 97.

The velocity of the water in mixing chamber 96 provides a venturi action to draw concentrate through the concentrate inlet port 97 and orifice 98 into region 96 where the concentrate is mixed with the water.

Water passageway 95 extends from the rear of the venturi assembly 73 forward to valve 104 which is above the mixing chamber 96 and in fluid communication therewith via orifice 105, and which is in communication with passageway 95 via orifice 106. Valve assembly 104 includes an adjusting screw 107 which is said to provide the proper amount of water to the mixture being prepared in the mixing chamber 96.

After dilution the mixture then flows from the constricted region or mixing chamber 96 forward to the end 99 of passageway 94. At the end 99 of the passageway 94 there is coupled to passageway 94 an L-shaped discharge nozzle 100 for directing the flow of the beverage downward into a waiting receptacle. Just forward of the rear end 101 of discharge nozzle 100 and just rearward of end 99 of passageway 94 there are located two communicating apertures 102, 103 in the upper portions of the passageway 99 and nozzle 100, respectively, for fluid communication between the atmosphere and the beverage flowing toward nozzle 100. The velocity of the beverage at this point provides a second venturi action through apertures 102, 103 and the beverage is aerated to impart the proper bouquet thereto. In the case of hot chocolate, the hot chocolate would be aerated rather than whipped as heretofore practiced.

The concentrate tank 89 is provided with a cover 108 having an aperture therein 109 for receiving the concentrate inlet port 97. The dispenser is additionally provided with an upper housing, or cover, 110 which is journaled to the lower housing 12 by means of hinges (not shown) to completely enclose the operating components of the dispenser. In addition, a drip receptacle, generally shown at 111, is provided as is the general practice with beverage dispensers.

Although the invention has been described with reference to a particular illustrative embodiment, many changes, modifications and variations thereof will become apparent to those skilled in the art and should be included within the scope of the invention as set forth in the appended claims.

I claim:

1. A hot beverage dispenser for connection to a source of electrical energy and a source of beverage dilution liquid, comprising: a frame; a pressure regulator mounted on said frame for connection to said source of dilution liquid; switch means mounted on said frame for connection to said source of electrical energy; three-way solenoid valve means connected to said switch means and including first, second and third ports, said first port in communication with the atmosphere, said second port connected in fluid communication with said pressure regulator; a sealed first tank connected in fluid communication with said third port of said solenoid valve means and mounted on said frame for holding a volume of dilution liquid, said solenoid valve means normally conditioned to place said first and third ports in communication and thereby place said first tank in communication with the atmosphere; means carried by said first tank and connected to said source of electrical energy for heating the dilution liquid; a second tank removably carried and embraced by said first tank for holding a volume of liquid beverage concentrate which is heated by the surrounding first tank; and a venturi mixing assembly connected in fluid communication with said first and second tanks, said venturi assembly being operable upon the operation of said switch means and a flow of dilution liquid through said assembly to draw liquid concentrate from said second tank and mix said liquid concentrate and said dilution liquid to form a hot beverage.

2. A liquid dispenser comprising: first reservoir means for holding a volume of liquid concentrate; second reservoir means for holding a volume of mixing liquid; means for mixing said liquid concentrate and said mixing liquid, said mixing means including a first input in fluid communication with said first reservoir means, a second input in fluid communication with said second reservoir means, a mixing chamber in fluid communication with said first and second inputs for drawing liquid concentrate through said first input and into said chamber upon a flow of mixing liquid through said second input, and an output; and means for pressurizing said second reservoir means to establish a flow of mixing liquid from said second reservoir means toward said output to said second input and said mixing chamber, said pressurizing means including a fluid circuit connected to said second reservoir means and for connection to a supply of mixing liquid under pressure, and a three-way valve in said fluid circuit and normally conditioned to provide communication between said second reservoir means and the atmosphere, and operable to provide fluid flow from the supply to said second reservoir means.

3. The liquid dispenser according to claim 2, and further comprising means for heating said second reservoir means.

4. The liquid dispenser according to claim 2, and further comprising means for heating said first and second reservoir means.

5. The liquid dispenser according to claim 2, and further comprising means for heating said first reservoir means.

6. The liquid dispenser according to claim 2, and further comprising means for heating said first reservoir means to maintain the liquid concentrate at a temperature of at least 140° F.

7. The liquid dispenser according to claim 2, wherein said output means includes a passageway therein in fluid communication with the atmosphere for aerating the dilute mixture by venturi action.

8. The liquid dispenser according to claim 2, comprising a pressure regulator connected in said fluid circuit for maintaining fluid flow at a constant pressure.

9. A liquid dispenser according to claim 2, wherein said three-way valve is a solenoid valve having an operating winding for connection to an electrical supply, and comprising switch means serially interposed between said operating winding and the electrical supply.

10. The liquid dispenser according to claim 2, wherein said second reservoir means comprises a tank having a closed bottom and an open top defined by an edge, a reservoir closing member having an edge and means securing said edges of said closing member and said tank, said securing means including a first fluid passageway connected to said input of said mixing means and a second fluid passageway connected to said three-way valve.